(12) United States Patent
Froman et al.

(10) Patent No.: US 8,042,377 B2
(45) Date of Patent: Oct. 25, 2011

(54) SYSTEM AND METHOD FOR TESTING OF TRANSDUCERS

(75) Inventors: Gary Froman, Fort Worth, TX (US); Keith Hale, Joshua, TX (US)

(73) Assignee: Bell Helicopter Textron Inc., Fort Worth, TX (US)

( * ) Notice: Subject to any disclaimer, the term of this patent is extended or adjusted under 35 U.S.C. 154(b) by 0 days.

(21) Appl. No.: 12/866,040

(22) PCT Filed: Jan. 29, 2009

(86) PCT No.: PCT/US2009/032381
§ 371 (c)(1),
(2), (4) Date: Aug. 4, 2010

(87) PCT Pub. No.: WO2009/099878
PCT Pub. Date: Aug. 13, 2009

(65) Prior Publication Data
US 2011/0000275 A1    Jan. 6, 2011

Related U.S. Application Data

(60) Provisional application No. 61/025,978, filed on Feb. 4, 2008.

(51) Int. Cl.
*G01P 21/00* (2006.01)
(52) U.S. Cl. .............................. 73/1.37; 73/1.38; 73/507
(58) Field of Classification Search .................... 73/1.37
See application file for complete search history.

(56) References Cited

U.S. PATENT DOCUMENTS

| 3,416,052 A | * | 12/1968 | Russell et al. ................. 318/599 |
| 3,830,091 A | * | 8/1974 | Sinsky ............................ 73/1.38 |
| 4,392,127 A | * | 7/1983 | Steele ............................ 340/604 |
| 5,265,131 A | * | 11/1993 | Scarola et al. ................. 376/259 |
| 6,904,804 B2 | * | 6/2005 | Schaumann ................ 73/514.32 |
| 2006/0169021 A1 | * | 8/2006 | Silverstein ...................... 73/1.37 |

FOREIGN PATENT DOCUMENTS

| JP | 03130666 A | * | 6/1991 |
| JP | 2005134135 A | * | 5/2005 |

OTHER PUBLICATIONS

International Preliminary Report on Patentability in PCT/US09/32381, mailed Feb. 14, 2011.

* cited by examiner

*Primary Examiner* — Hezron E Williams
*Assistant Examiner* — Paul West
(74) *Attorney, Agent, or Firm* — James E. Walton; Noah A. Tevis

(57) ABSTRACT

A transducer test system for testing accelerometers or velocity transducers includes a signal conditioner and a shaker that can be used in a field environment, for example by an avionics technician at an aircraft. A test transducer and a reference transducer, which is a known-good version of the test transducer, are mounted onto the shaker and electrically connected to the signal conditioner. The technician shakes the two transducers simultaneously by manually shaking the shaker. The signal conditioner receives and compares the signals output from the test and reference transducer in order to determine the operating condition of the test transducer.

20 Claims, 4 Drawing Sheets

SYSTEM AND METHOD FOR TESTING OF TRANSDUCERS

TECHNICAL FIELD

The present application relates to systems and methods for testing measurement devices, such as transducers for measuring acceleration and/or velocity.

DESCRIPTION OF PRIOR ART

Accelerometers are transducer devices for measuring acceleration and are commonly used on aircraft. Velocity transducers measure velocity and are similar to accelerometers, but the acceleration signal is integrated to represent velocity. Typically, these types of transducer devices are tested using an electromechanical shaker in a laboratory environment, a shaker controller, an accelerometer power supply, and an expensive spectrum analyzer to measure and characterize the accelerometer output. This method does not lend itself to testing in the field because of the bulk and expense of the equipment.

DETAILED DESCRIPTION

Figure 1:
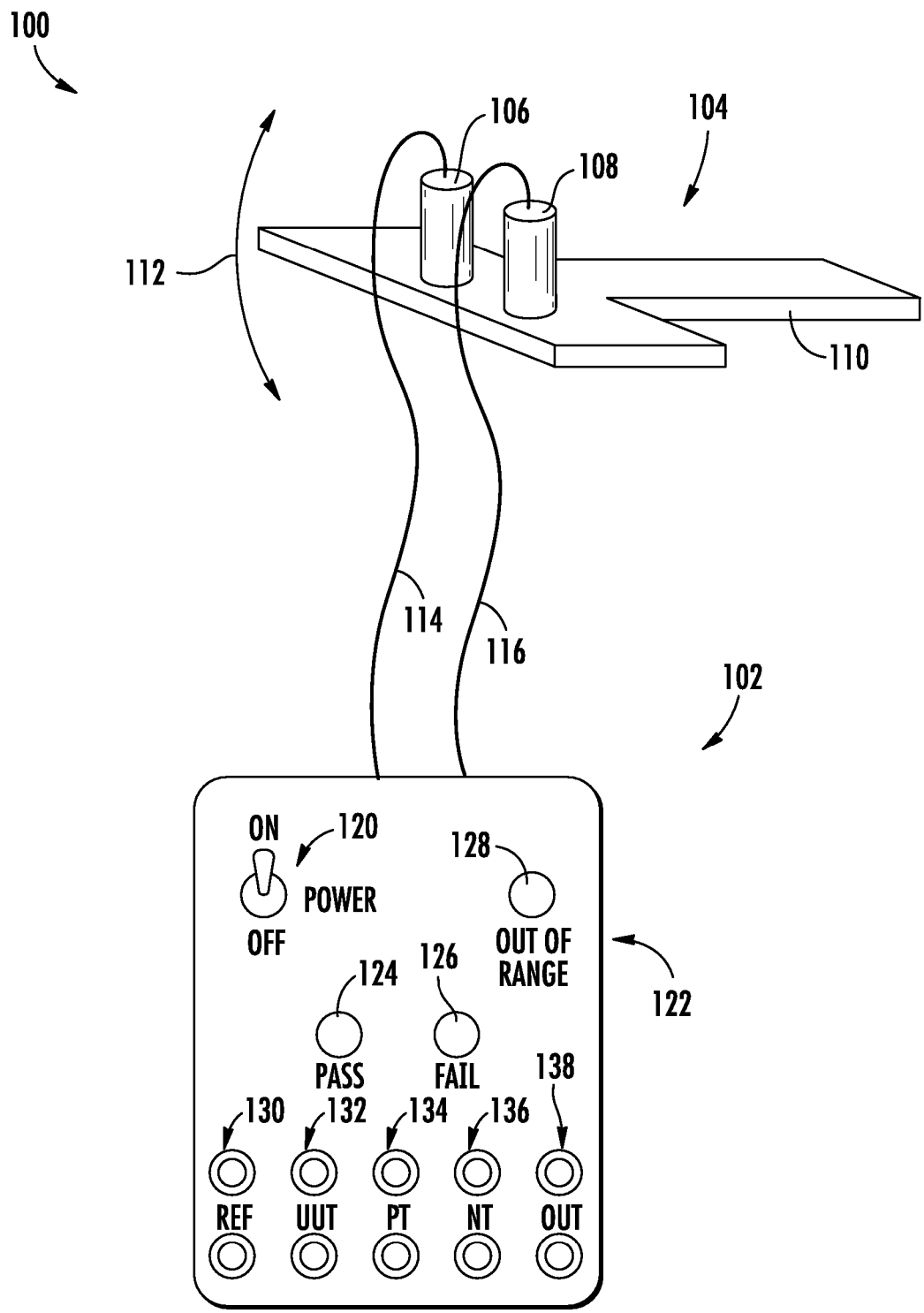
FIG. 1 shows a view of an exemplary embodiment of an accelerometer or velocity transducer test system.

Referring to FIG. 1 in the drawings, the preferred embodiment of a transducer test system 100 comprising a signal conditioner unit 102 and a manual shaker 104 is illustrated. The test system 100 is particularly useful for testing transducers such as accelerometers and velocity transducers. For example, the test system 100 is useful for testing accelerometers such as those used on aircraft to measure low frequency rotor vibration. However, it should be appreciated that other types of accelerometers and velocity transducers can be tested using the test system 100. The following detailed description makes reference to the testing of an accelerometer 108; however, it should be appreciated that a velocity transducer can be tested in the same manner using a reference velocity transducer.

A reference accelerometer 106 and test accelerometer 108 are secured to the manual shaker 104. The reference accelerometer 106 is a known-good version of the test accelerometer 108 that is undergoing evaluation by the test system 100. The manual shaker 104 also includes a handle 110 sized and shaped so as to be suitable for grasping in the hand of an individual, e.g., a technician, conducting the accelerometer test. The handle 110 allows the technician to shake the two accelerometers 106 and 108 with an up and down motion as indicated by arrow 112 simultaneously at a predetermined frequency.

The signal conditioner unit 102 is connected to the reference and test accelerometers 106 and 108 via signal cables 114 and 116, respectively. The signal conditioner unit 102 comprises a power switch 120 and display 122. In the illustrated embodiment, the display 122 comprises a Pass Light Emitting Diode (LED) 124, Fail LED 126, and Out of Range LED 128. In a preferred embodiment, the Pass, Fail, and Out of Range LEDs can each emit a unique color of light so as to be easily distinguishable from each other if the user is observing from as distance, for example the Pass LED 124 can emit green light, the Fail LED 126 can emit red light, and the Out of Range LED 128 can emit yellow light. The signal conditioner unit 102 can include an internal power source, such as batteries, and/or power circuitry for connection to an external power source. The signal conditioner unit 102 supplies electrical power to both the reference accelerometer 106 and the test accelerometer 108.

Once the user has attached the accelerometers 106 and 108 to the shaker 108, connected the cables 114 and 116 between the signal conditioner 102 and the accelerometers 106 and 108, and made any necessary connections for supplying electrical power to the signal conditioner 102, then the user can turn on the signal conditioner 102 using the power switch 120 and begin a test of the test accelerometer 108. The user then grasps the shaker 104 by the handle 110 and proceeds to shake the two accelerometers 106 and 108 with an up and down motion as indicated by the arrow 112. The vibration output signals of both accelerometers 106 and 108 are provided to the signal conditioner 102 via the respective signal cables 114 and 116, where both signals are buffered, filtered, and subtracted from each other. The resulting signal is an error signal of the two accelerometers 106 and 108. This error signal is compared to adjustable thresholds, both positive and negative. If either threshold is exceeded, then the Fail LED 126 is illuminated. If the error signal is between the positive and negative thresholds, then the Pass LED 124 is illuminated.

The user may shake at low amplitudes, medium amplitudes, or high amplitudes. The Out of Range LED 128 will illuminate if the user is shaking the accelerometers too hard. Low frequencies and medium frequencies can be tested using the manual shaker 104. The input frequency limitations are that of the human body since it is a manual shaker. Frequencies of interest are typically in a range of 1 to 7 hertz. Output DC bias voltages are also compared between the two accelerometers 106 and 108, as this is also an important indicator of proper accelerometer operation.

The illustrated embodiment of the signal conditioner 102 also includes a plurality of optional test points, which include reference accelerometer output ("REF") 130, accelerometer under test output ("UUT") 132, positive trip threshold ("PT") 134, negative trip threshold ("NT") 136, and out of range trip threshold ("OUT") 138. The REF test point 134 allows the user to monitor the output of the reference accelerometer 106 using an oscilloscope or the like. The UUT test point 132 allows the user to monitor the output of the test accelerometer 108 using an oscilloscope or the like. The PT test point 134 allows the user to monitor the positive fail trip threshold using a voltmeter or the like. The NT test point 136 allows the user to monitor the negative fail trip threshold using a voltmeter or the like. The OUT test point 138 allows the user to monitor the out of range threshold using a voltmeter or the like. Note that the test points 130-138 each include respective signal output and signal ground connection points.

Figure 2:
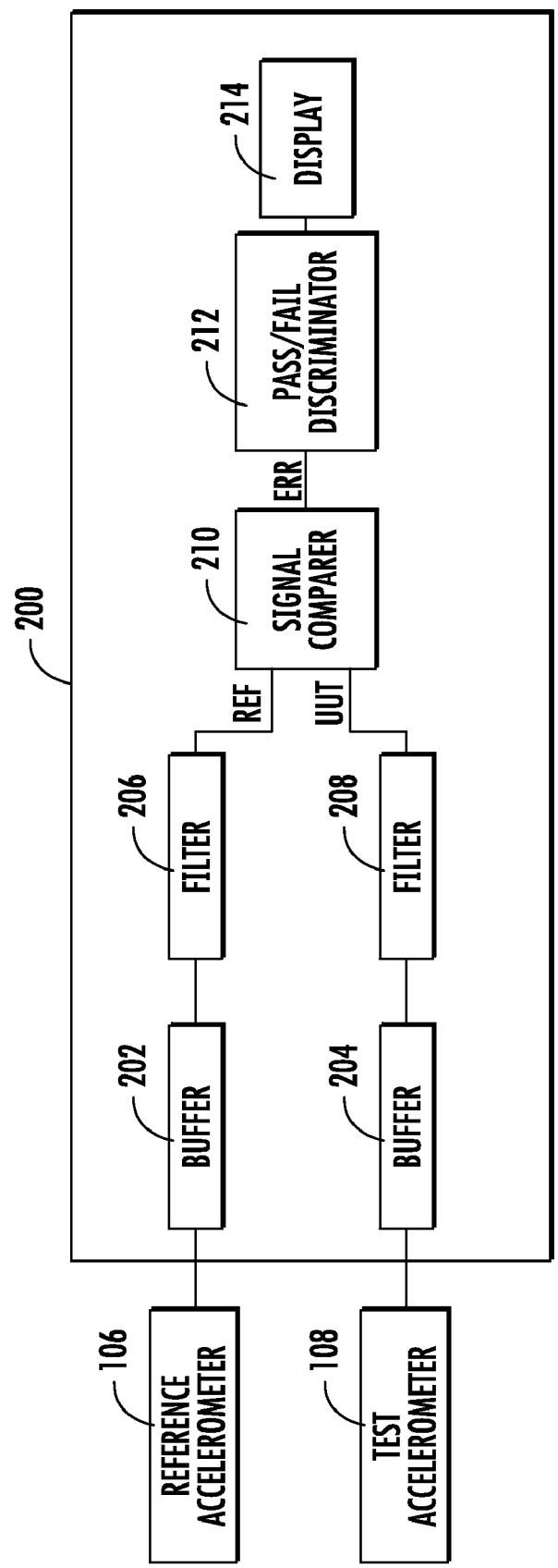
FIG. 2 is a block diagram of an embodiment of the signal conditioner unit shown in FIG. 1.

Turning next to FIG. 2, a block diagram of a signal conditioner unit 200 is shown, which constitutes an embodiment of the signal conditioner unit 102 shown in FIG. 1. The signal conditioner unit 200 receives signals from a reference accelerometer 106 and a test accelerometer 108 as they are shaken, for example on a shaker such as the manual shaker 104 shown in FIG. 1. The signals received from the reference accelerometer 106 and test accelerometer 108 are each buffered in a respective buffer 202 and 204 and then filtered in a respective filter 206 and 208. The filters 206 and 208 can include a low-pass filter for filtering high-frequency noise. The filtered reference signal REF from the reference accelerometer 106 and the filtered test signal UUT from the test accelerometer 108 are both supplied to a signal comparer 210. The buffers 202 and 204 allow the timing of the REF and UUT signals to the signal comparer 210 to be representative of a substantially same point in time as the reference and test accelerometers 106 and 108 are shaken so that an accurate comparison of the output signals of the reference and test accelerometers 106 and 108 can be made by the signal comparer 210. The signal comparer 210 determines the difference between the REF and UUT signals and outputs the difference as an error signal ERR to a Pass/Fail Discriminator 212. The discriminator 212 compares the error signal ERR to one or more thresholds to determine whether the error signal ERR exceeds such thresholds. The thresholds can be pre-programmed or manually adjustable by the user according to predetermined allowable tolerances in the particular accelerometer undergoing testing (test accelerometer 108).

A display 214 then provides the user with a visual indication as to whether the test accelerometer 108 passed the test or failed the test. Alternative embodiments can include additional or alternative indications, for example an audible signal such as a voice or tone representative of a pass or fail condition. As illustrated in FIG. 1, the display can include one or more lights such as LEDs that provide pass or fail indications. Alternative embodiments can include any type of display and/or provision for connection and control of an external display. Alternative embodiments of the signal conditioner unit 200 can include means for programming the signal conditioner unit 200, for example in order to allow a user to adjust the thresholds used by the pass/fail discriminator 212 or select from a list of one or more pre-programmed thresholds to be used by the pass/fail discriminator 212.

Figure 3A:
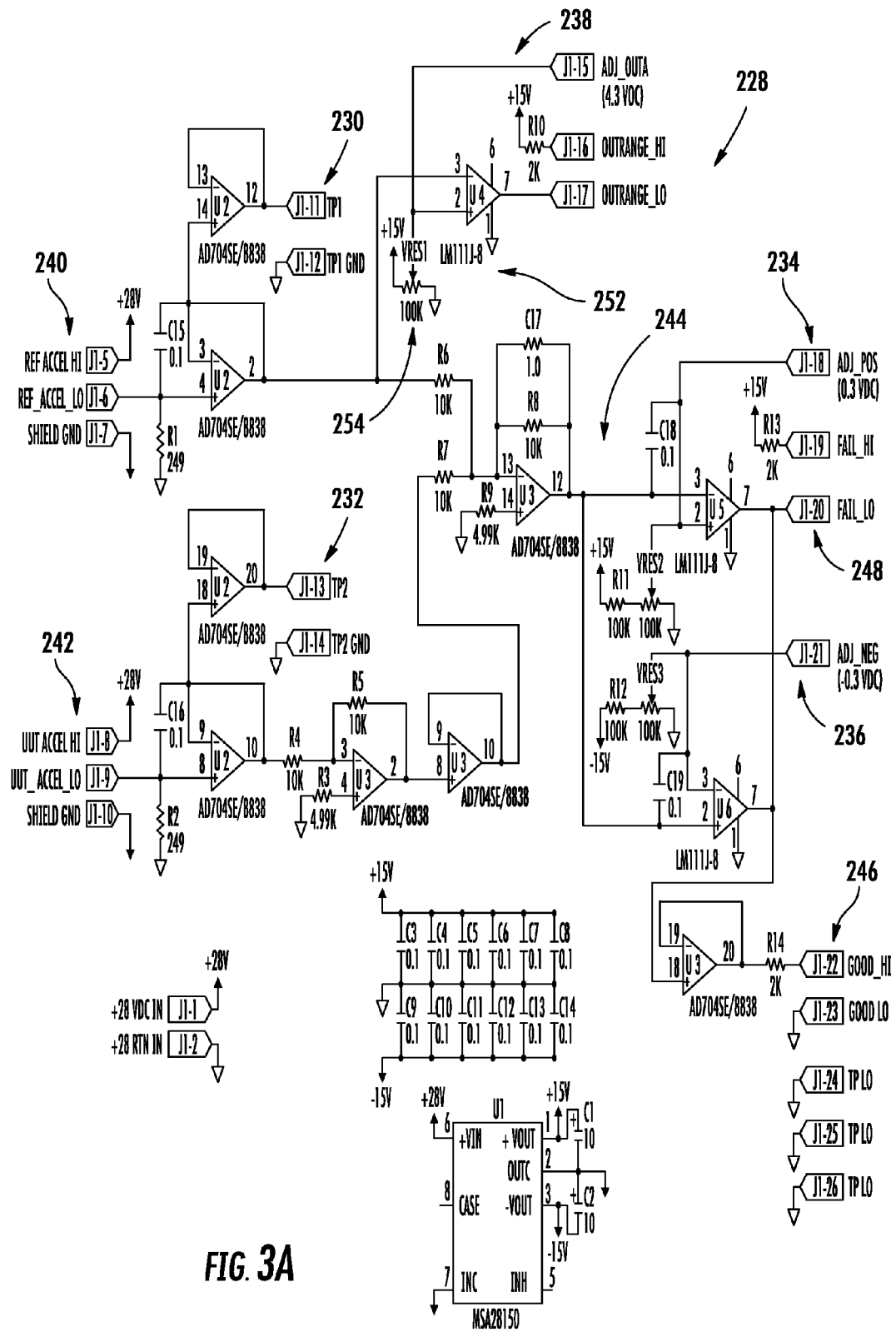
FIGS. 3A and 3B are schematic diagrams of an embodiment of the signal conditioner unit shown in FIGS. 1 and 2.
Figure 3B:
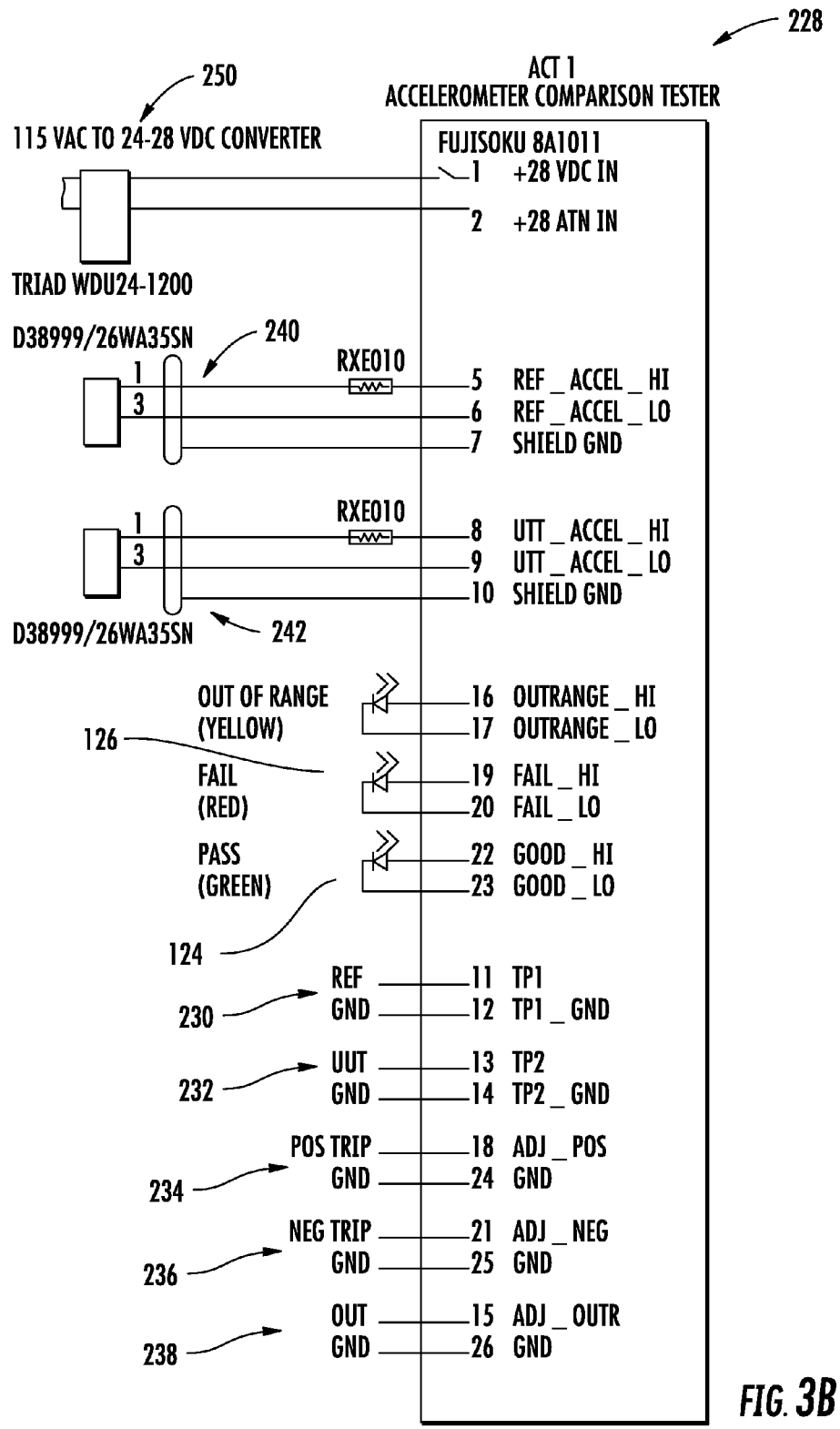

FIGS. 3A and 3B show schematic diagrams of a signal conditioner 228, which constitutes an embodiment of the signal conditioner 102. The signal conditioner 228 includes optional test points, including reference accelerometer output ("REF") 230, accelerometer under test output ("UUT") 232, positive trip threshold ("PT") 234, negative trip threshold ("NT") 236, and out of range trip threshold ("OUT") 238. A reference accelerometer 106 provides a signal to input 240, while a test accelerometer 108 provides a signal to input 242. The signals are compared to adjustable thresholds at comparer section 244. A pass section 246 provides a "pass" signal to an alert device, for example the pass LED 124, if the difference between the signals from the reference and test accelerometers 106 and 108 is within tolerances. On the other hand, if the difference between the signals from the reference and test accelerometers 106 and 108 is not within tolerances, then a fail section 248 provides a "fail" signal to an alert device, for example the fail LED 126. In the illustrated embodiment, the signal conditioner 228 includes a power adapter 250 that allows the signal conditioner 228 to receive electrical power from an external source. Alternative embodiments of the signal conditioner 228 can include provisions for batteries that can be used to supply electrical power to the signal conditioner 228.

The signal from the reference accelerometer 106 is also used to determine whether the signal level is out of range, e.g. because the user is shaking the shaker 104 with too much amplitude so as to saturate the accelerometer 106. An out of range test section 252 compares the reference signal to a range threshold signal. In the illustrated embodiment, the range threshold signal is adjustable by adjusting a potentiometer 254. If the reference signal level exceeds the range threshold signal, then the user is alerted, e.g. by illumination of the Out of Range LED 128.

An example of a test procedure that includes use of the transducer test system 100 for evaluating the operating condition of a test accelerometer 108 can proceed as follows. The test accelerometer 108 is first inspected, including inspection for damage of any connector parts. The accelerometer connection parts are then cleaned, for example using isopropyl alcohol and a soft bristle brush. This cleaning process can include repeating steps of submersing connection pins in isopropyl alcohol, brushing the submersed pins, and then pouring out the alcohol through a white cloth until the alcohol appears clean. The accelerometer connection parts are then dried, or allowed to dry. The test accelerometer 108 is then installed onto the shaker 104 and connected to the signal conditioner 102 via signal cable 116. If not already installed, the reference accelerometer 106 is also installed onto the shaker 104 and connected to the signal conditioner 102 via signal cable 114. Depending on the particular embodiment, the signal conditioner 102 is either connected to an external electrical power source or internal batteries are installed, if not already in place. The user then grasps the handle 110 of the shaker 104, preferably with their thumb positioned on the top of the shaker near where the handle 110 intersects with the accelerometers 106 and 108. In some embodiments, the shaker 104 can include an indicia indicating proper placement of the hand, fingers, and/or thumb. The power switch 120 is moved to the "ON" position and the user observes the power-up sequence (if any) of the LEDs 124-128. For example, in some embodiments the Pass LED 124 will be illuminated intermittently during a power-up sequence and then continuously. The user then shakes the accelerometers 106 and 108 using the shaker 104 in an up and down motion. Preferably the user will start with a slow frequency of approximately 1 cycle per second, then increase the frequency until reaching approximately 7 cycles per second. It is desirable to test the test accelerometer 108 at multiple frequencies, for example at 1 hertz, 3 hertz, and 6 hertz. If the out of range LED 128 flashes, then the user should reduce the amplitude of the shaking motion. The Pass LED 124 should stay on continuously during the shake test and the Fail LED 126 should not flash. Ideally, the shake amplitude should be at a level slightly less than the threshold that causes the out of range LED 128 to illuminate. After several seconds of shaking with the pass LED 124 on continuously, the test accelerometer 108 has passed the test. However, if the Fail LED 126 flashes intermittently or continuously, then the test accelerometer 108 has failed the test.

The transducer test system described above can be used to test the operating condition of an accelerometer whose condition is unknown or suspected to be out of tolerance. The transducer test system 100 provides for a compact and relatively inexpensive apparatus compared to prior testing systems. The transducer test system 100 can advantageously be used by front-line technicians, for example avionics technicians working at an aircraft rather than sending the accelerometer or velocity transducer back to the manufacturer or to a laboratory for evaluation. This allows for considerable savings both in terms of time, for example while troubleshooting a larger system such as an aircraft, and expense, as unnecessary replacement of transducers may be avoided. Thus, the transducer test system is simple, inexpensive, and accurate for field testing low frequency accelerometers. The transducer test system eliminates the need for expensive and bulky electromechanical shaker and frequency analyzer for evaluating transducer performance.

The particular embodiments disclosed above are illustrative only, as the invention may be modified and practiced in different but equivalent manners apparent to those skilled in the art having the benefit of the teachings herein. It is therefore evident that the particular embodiments disclosed above may be altered or modified, and all such variations are considered within the scope and spirit of the invention. Accordingly, the protection sought herein is as set forth in the description. It is apparent that an invention with significant advantages has been described and illustrated. Although the present invention is shown in a limited number of forms, it is not limited to just these forms, but is amenable to various changes and modifications without departing from the spirit thereof.

The invention claimed is:

1. A transducer test system comprising:
   a manual shaker for supporting a test transducer and a reference transducer while the test transducer and reference transducer are shaken by a user, thereby subjecting the test transducer and the reference transducer to frequencies generated by manual shaking such that the frequencies correspond with a manual shaking frequency of the user; and
   a signal conditioner unit for receiving both a reference output signal from the reference transducer and a test output signal from the test transducer, such that the reference output signal and the test output signal are representative of data from substantially the same point in time, the signal conditioner comprising:
   a signal comparer for comparing the test output signal to the reference output signal, thereby generating an error signal representative of a difference between the test output signal and the reference output signal, the difference being a comparison of the test output signal and the reference output signal at substantially the same point in time;
   a discriminator for receiving the error signal and for determining whether the error signal exceeds a predetermined threshold; and
   a display for providing a visual indication as to whether the error signal exceeds the predetermined threshold,
   wherein the signal conditioner unit receives the reference output signal and the test output signal while the manual shaker is manually shaken, and
   wherein the display of the signal conditioner includes an out-of-range indicator for indicating to the user whether the user is shaking the manual shaker improperly.

2. The transducer test system of claim 1, wherein the manual shaker includes a handle suitable for grasping and shaking the manual shaker.

3. The transducer test system of claim 1, wherein the signal conditioner further comprises a first buffer for buffering the test output signal and a second buffer for buffering the reference output signal.

4. The transducer test system of claim 1, wherein the signal conditioner further comprises a first filter for filtering the test output signal and a second filter for filtering the reference output signal.

5. The transducer test system of claim 1, wherein the test output signal is representative of a test output voltage from the test transducer, and the reference output signal is representative of a reference output voltage from the reference transducer.

6. The transducer test system of claim 1, wherein the signal conditioner further comprises an out-of-range test section for determining whether the reference signal exceeds a range threshold.

7. The transducer test system of claim 6, wherein the range threshold is adjustable by adjusting a potentiometer.

8. The transducer test system of claim 1, wherein the display includes at least one of a pass indicator and a fail indicator.

9. The transducer test system of claim 1, wherein the signal conditioner further comprises at least one of a reference transducer output test point, a test transducer output test point, a positive trip threshold test point, a negative trip threshold test point, and an out-of-range trip threshold test point.

10. The transducer test system of claim 1, wherein the test transducer is a test accelerometer, and the reference transducer is a reference accelerometer.

11. The transducer test system of claim 1, wherein the test transducer is a test velocity transducer, and the reference transducer is a reference velocity transducer.

12. A method of testing a test transducer comprising:
    manually shaking the test transducer and a reference transducer simultaneously using a manual shaker that supports the test transducer and the reference transducer, thereby subjecting the test transducer and the reference transducer to frequencies generated by the manual shaking such that the frequencies correspond with a manual shaking frequency of the user, thereby causing the test transducer to output a test output signal and causing the reference transducer to output a reference output signal, the test output signal and the reference output signal being data from substantially the same point in time;
    comparing both the test output signal received from the test transducer to the reference output signal received from the reference transducer;
    generating an error signal representative of a difference between the test output signal and the reference output signal;
    providing an out-of-range indication to a user if the test transducer and reference transducer are being manually shaken improperly;
    determining whether the error signal exceeds a predetermined threshold; and
    providing an indication as to whether the error signal exceeds the predetermined threshold.

13. The method of claim 12, wherein the manually shaking includes manually shaking the test transducer at a predetermined frequency.

14. The method of claim 12, further comprising buffering the test output signal and the reference output signal prior to comparing the test output signal to the reference output signal.

15. The method of claim 12, further comprising filtering the test output signal and the reference output signal prior to comparing the test output signal to the reference output signal.

16. The method of claim 12, wherein the test output signal is representative of a test output voltage from the test transducer, and the reference output signal is representative of a reference output voltage from the reference transducer.

17. The method of claim 12, further comprising determining whether the reference signal exceeds a range threshold.

18. The method of claim 17, wherein the range threshold is adjustable by adjusting a potentiometer.

19. The method of claim 12, wherein the test transducer is a test accelerometer, and the reference transducer is a reference accelerometer.

20. The method of claim 12, wherein the test transducer is a test velocity transducer, and the reference transducer is a reference velocity transducer.

* * * * *